United States Patent
Chen (10) Patent No.: US 7,630,449 B2
(45) Date of Patent: Dec. 8, 2009

(54) METHOD AND RECEIVER CAPABLE OF INCREASING ACQUISITION EFFICIENCY IN A CODE DIVISION MULTIPLE ACCESS COMMUNICATION SYSTEM

(75) Inventor: An-Bang Chen, Kao-Hsiung Hsien (TW)

(73) Assignee: Lite-On Technology Corp., Taipei (TW)

( * ) Notice: Subject to any disclaimer, the term of this patent is extended or adjusted under 35 U.S.C. 154(b) by 624 days.

(21) Appl. No.: 11/419,746

(22) Filed: May 22, 2006

(65) Prior Publication Data

US 2007/0211792 A1    Sep. 13, 2007

(30) Foreign Application Priority Data

Mar. 8, 2006    (TW) ............................... 95107786 A (51) Int. Cl.
*H04K 1/10*    (2006.01)
*H04B 1/707*   (2006.01)
*H04J 11/00*   (2006.01)

(52) U.S. Cl. .................. 375/260; 375/150; 370/210

(58) Field of Classification Search ................ 375/134, 375/137, 147, 149, 150, 152, 260, 343; 370/208, 370/210, 335, 342; 708/400, 402–405
See application file for complete search history.

(56) References Cited

U.S. PATENT DOCUMENTS

| | | | |
|---|---|---|---|
| 2001/0033606 A1* | 10/2001 | Akopian et al. | 375/149 |
| 2003/0161543 A1* | 8/2003  | Tanaka         | 382/250 |
| 2003/0231704 A1* | 12/2003 | Tanaka et al.  | 375/150 |
| 2004/0138811 A1* | 7/2004  | Teranishi et al. | 701/213 |
| 2005/0168382 A1* | 8/2005  | Awata          | 342/357.02 |
| 2006/0071851 A1* | 4/2006  | Graas et al.   | 342/357.14 |

* cited by examiner

*Primary Examiner*—Young T. Tse
(74) *Attorney, Agent, or Firm*—Rosenberg, Klein & Lee (57) ABSTRACT

A method capable of increasing acquisition efficiency in a code division multiple access (CDMA) communication system includes receiving a first signal, generating a second signal by performing a Fourier transform operation for the first signal, determining a plurality of shift signals generated by shifting the second signal a first frequency each time, choosing a pseudo-random code from a plurality of pseudo-random codes and performing a Fourier transform operation for the chosen pseudo-random code, multiplying the plurality of shift signals with a result of performing the Fourier transform operation for the chosen pseudo-random code, and performing an inverse Fourier transform operation for the multiplication result, and determining a status of acquisition.

10 Claims, 5 Drawing Sheets

Fig. 1 Proir art

METHOD AND RECEIVER CAPABLE OF INCREASING ACQUISITION EFFICIENCY IN A CODE DIVISION MULTIPLE ACCESS COMMUNICATION SYSTEM

BACKGROUND OF THE INVENTION

1. Field of the Invention

The present invention relates to a method and receiver in a code division multiple access (CDMA) communication system, and more particularly, to a method and receiver capable of increasing acquisition efficiency in a CDMA communication system.

2. Description of the Prior Art

Global positioning systems (GPS) detect positions according to radio waves and time differences between transmitters and a receiver. Furthermore, the receiver can provide exact information regarding latitude, altitude, speed, and time. This information is based on ranging codes from the transmitter. The ranging codes are C/A (i.e., coarse/acquisition), and P code (i.e., precision codes). The C/A codes are provided for general users. The C/A codes provide lower precision of positioning capability than the P codes. The P codes are constructed by shorter chips, and provided for military uses, which will not be mentioned further. In the GPS, each satellite has a unique C/A code for acquisition and, most important, navigation data. In the satellite, the navigation data undergoes a convolution operation with the C/A code, and is modulated with a carrier. The navigation data includes ephemeris data, almanac data, launch time of the navigation data, timing calibration data, status of all satellites, propagation delay parameters of ionosphere, UTC parameters, and other included data not highlighted herein.

Relatively, workflow of the receiver is to search and lock the C/A codes, to capture C/A codes, to capture carrier, to synchronize information bit, to synchronize data frame byte, to search and acquire other satellites, calculate pseudo-range between each satellite, to solve simultaneous equations to obtain positions. In a typical satellite tracing method, the receiver first determines a number of satellites within the range of the receiver, and then the receiver will lock a satellite to execute an acquisition operation. The satellite depends on route data stored in the receiver and also time and position of the receiver when determining the satellites within the range of the receiver. The standard booting method of the receiver is known as a warm reboot or a soft reboot. On the contrary, the booting method for the receiver boots that boots without any information is known as a cold reboot. At this time, software of the receiver requires a better system to search satellites, once a satellite is locked down, the receiver can utilize the information read and then determine the number of satellites within its range. In general, satellite signal intensity received at ground is lower than the thermal noise of the receiver. This is due to spread spectrum being decoded and a longer propagated distance, in order to abstract the satellite signals from the noise, the GPS utilizes a code correlation technology. First, the receiver generates a set of codes for comparison with signals received from the satellite. When the two sets of codes match, the correlation value is greatest, and thus the original signal spectrum can be obtained after the spread spectrum is decoded.

Therefore, in executing a signal acquisition, in order to find a start point of the signal, a method utilized is a running sum of a time domain, which is to add up multiplications of point by point after shifting. The running sum of the time domain can calculate convolution result of signals and codes, but this method will consume a lot of time. According to the Fourier transform theory, convolution calculation of two signals on the time domain is converted onto the frequency domain for multiplication of spectrums of the two signals. Therefore, the conventional method realizes the running sum by multiplying frequency domain, in other words, the running sum operation of the two signals is first executed and then converted to the frequency domain, multiplication of the spectrum of the two signals is then executed, and the result of the multiplication of the frequency domain is finally converted back to the time domain. Although this method includes calculations such as Fourier transform and inverse Fourier transform, and multiplication of $N^2$ required by the running sum is then simplified to multiplication of $N^{th}$. However, the fastest cold reboot of the receiver of the conventional GPS requires 45 to 50 seconds (whereas some machines require up 120 seconds), in this period of time, 18 to 24 seconds are spent on waiting for the satellite to transmit route signals, while the rest of the 20 to 30 seconds are spent on acquisition of signal. If the satellite signal transmission is being blocked, then there is a need to search again and wait, thus the time for the cold reboot will increase.

The primary reason for the conventional method to require 20 to 30 seconds performing the acquisition of signal operation is that the receiver is unable to know intensity of frequency shift caused by the Doppler effect. The Doppler effect is caused by relative movement, for example, by the relative movement of the transmitter end (satellite) and the receiver. More Specifically, when a user is navigating through a vehicle receiver, signals received by the receiver will demonstrate a frequency shift phenomenon. As the moving speed of the vehicle is accelerating, then this effect will become more obvious/pronounced; frequency spectrum S of the Doppler effect can be represented, for example, as an omni directional antenna receiving signal:

$$S = \frac{1}{2\pi f_D \sqrt{1 - \left(\frac{f - f_C}{f_D}\right)^2}}$$

f: operating frequency after the Doppler effect
$f_C$: original operating frequency
$f_D$: Doppler frequency Therefore, in the GPS, the receiver has to consider the Doppler effect's affect on the frequency of the received signal. Other than that, the receiver is also required to include a mechanism and a calculation for generating C/A codes, hence in this way, calculation resources of the microprocessor is being occupied.

Figure 1:
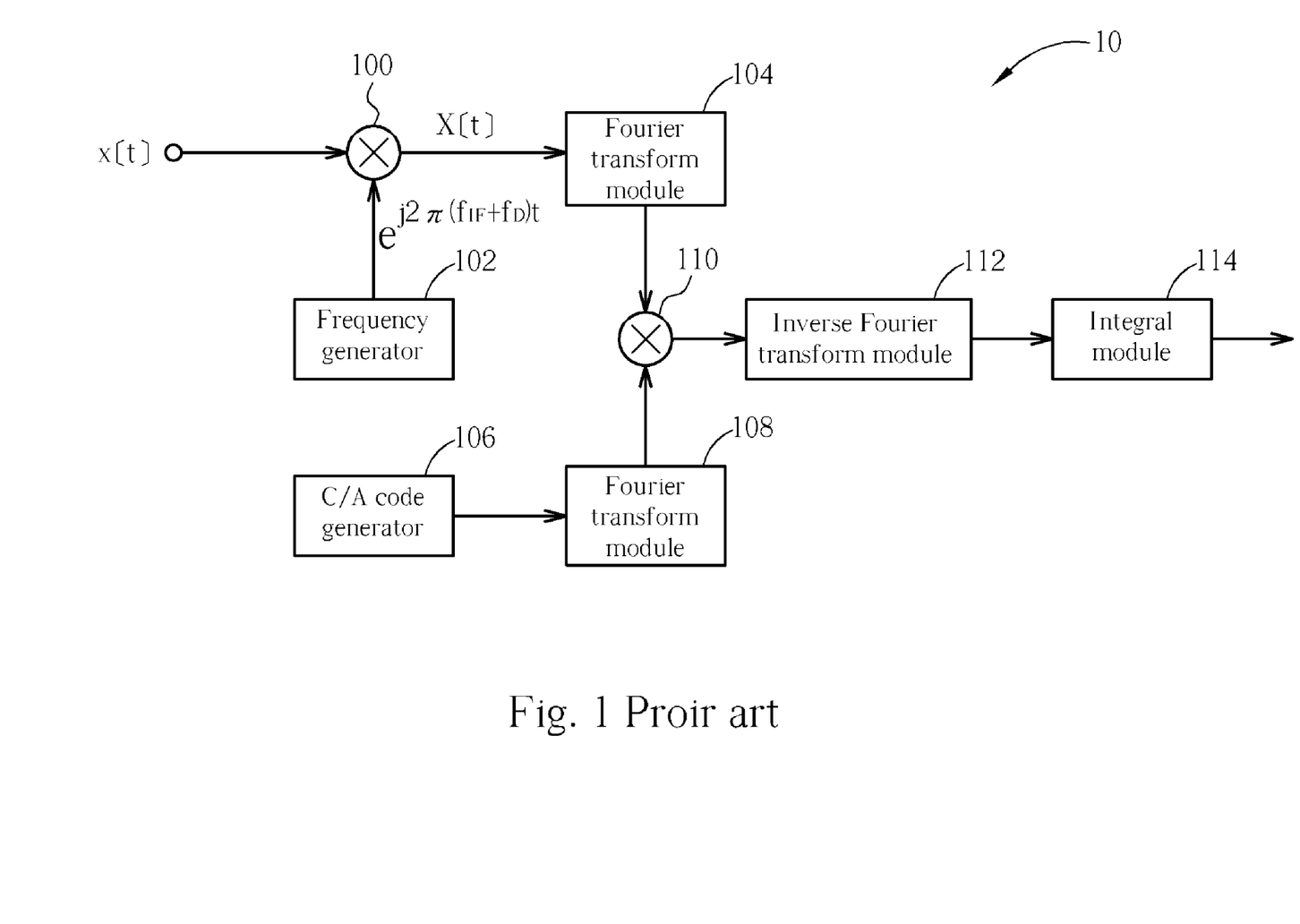
FIG. 1 illustrates a diagram of a baseband processing module of a receiver of a conventional GPS according to an embodiment of the present invention.

Please refer to FIG. 1. FIG. 1 illustrates a diagram of a baseband processing module 10 of a receiver of a conventional GPS. The operating method of the baseband processing module 10 is as follows: firstly, a multiplier 100 multiplies a digital medium frequency signal X [t] with a signal $e^{j2\pi(f_{IF}+f_D)t}$ generated by a frequency generator 102 so that frequency of the digital medium frequency X [t] is lowered to a baseband, where $f_{IF}$ represents frequency of a medium frequency, and fD represents the Doppler effect. In searching for a signal, the receiver cannot know the accurate Doppler frequency, therefore $f_D$ will be in between the range of −5 KHz to +5 KHz, and a search is performed every 500 Hz. Hence, $f_D$ will have 21 different values such that the multiplier 100 has to perform a multiplication operation for 21 times. The product result of the multiplier 100 will pass through a Fourier transform module 104 to obtain frequency of a digital baseband signal X' [t]. Otherwise, a C/A code generator 106 can generate a set of 1023 bit C/A code frame, and the frequency of the C/A code frame can be obtained after passing through the Fourier transform module 108. As previously mentioned, the running sum operation of the two signals on the time domain is first executed and then converted to the frequency domain for multiplication of spectrum of the two signals. Therefore, a multiplier 110 is utilized for calculating the product of the signals outputted by the Fourier transform modules 104, 108, which is a frequency product of the baseband digital signal X' [t] and C/A code frame, the obtained result is then passed through an inverse Fourier transform module 112 to be converted to the time domain. Lastly, a degree of correlation of the signal X [t] received by the baseband processing module 10 and the C/A code frame generated by the C/A code generator 106 can be obtained through an integral module 114, thus the result can determine whether acquisition is completed.

Thus, in the situation of determining acquisition through the baseband processing module 10, for each C/A code (which is each cycle), if the digital medium frequency signal X [t] includes N points (or quadrants), and a Fast Fourier transform algorithm and an Inverse Fast Fourier transform algorithm are utilized to realize the Fourier transform module 104, 108 and the inverse Fourier transform module 112, the calculations required are listed in the following:

1. Multiplication for 21 N points: 21 N points multiplication calculation required for the multiplication of $e^{j2\pi(f_{IF}+f_D)t}$ of different $f_D$ value and the digital medium frequency signal X [t].

2. Fast Fourier transform calculation of 21 N points: calculation required for the Fourier transform module 104 to convert 21 multiplying results outputted by the multiplier 100.

3. Fast Fourier transform calculation for 1 N point: calculation required for the Fourier transform module 108 to convert C/A codes generated by the C/A code generator 106.

4. Multiplication of 1 N point: calculation required for the multiplier 110 to calculate the product of signals outputted by the Fourier transform modules 104, 108.

5. Fast inverse Fourier transform calculation for 1 N point: calculation required for the inverse Fourier transform module 112.

Because the Fast Fourier transform is a fast realization for Discrete Fourier transform, the algorithm can be executed in three steps. The steps are: 1. rearrange N quadrant input signals into N quadrant signals; 2. execute N 1-point Discrete Fourier transform result to merge into an N point Discrete Fourier transform. Therefore, those skilled in the art will know that Fast Fourier transform of N point signal requires ((N/2)×B) multiplication and (N×B) addition, where B represents the order of merge which is equal to ($\log_2 N$).

Hence, total calculation Ct required by the baseband processing module 10 in each cycle is:

Ct=21×(multiplication of N point)+21×(Fast Fourier transform calculation of N point)+1×(Fast Fourier transform calculation of N point)+(multiplication of N point)+1×(Inverse Fast Fourier transform calculation of N point)=((22×N+(23/2)×N×$\log_2$N) number of multiplication calculation)+((23× N×$\log_2$N) number of addition calculation)

It is well-known that there are 24 satellites in space providing the GPS services, therefore under the worse case scenario, the baseband processing module 10 requires (24×Ct) calculations in order to complete the cold reboot sequence. Other than that, calculations required by the C/A code generator 106 will reduce efficiency.

Figure 2:
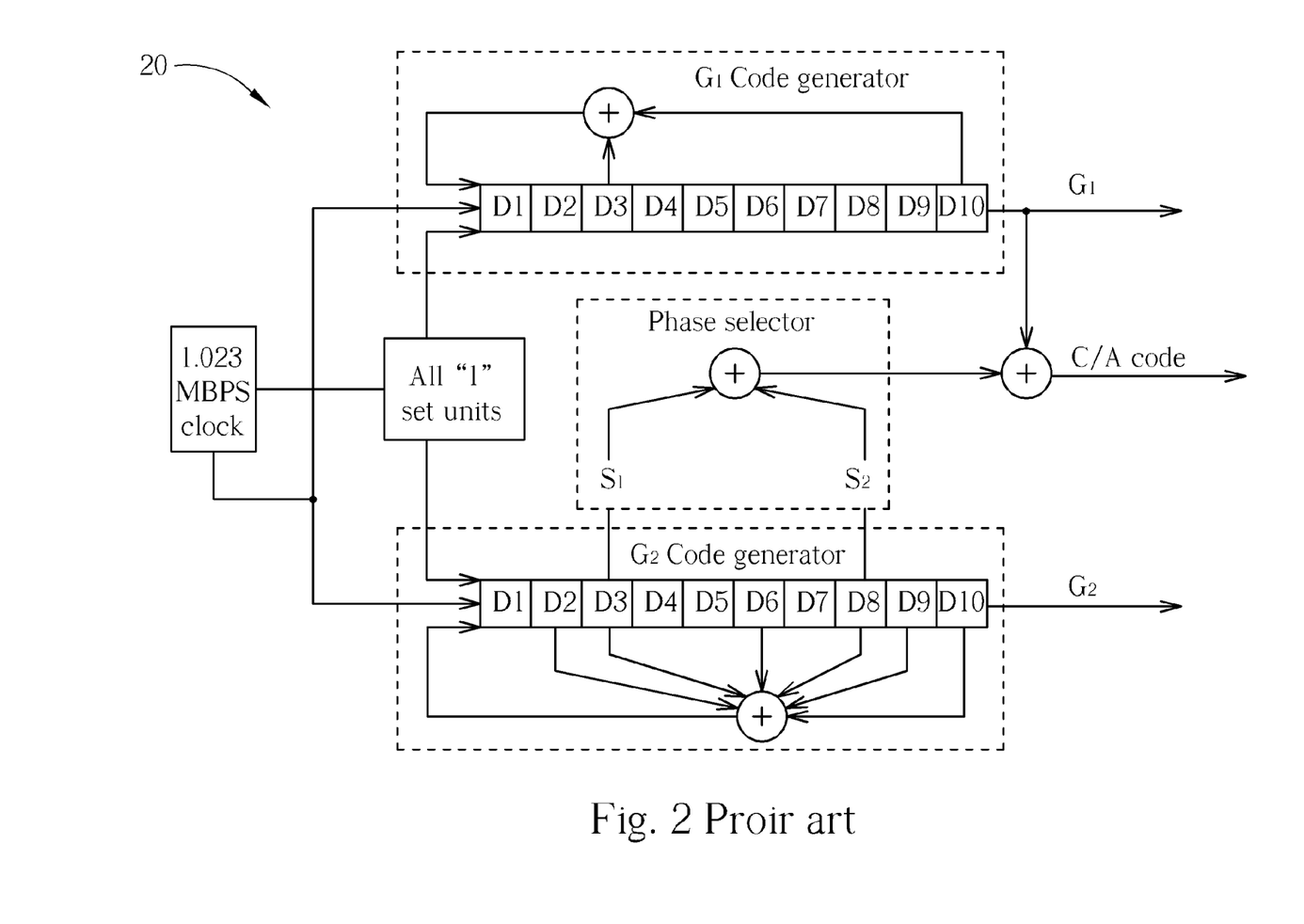
FIG. 2 illustrates a diagram of a conventional C/A code generator according to the prior art.

Please refer to FIG. 2. FIG. 2 illustrates a diagram of a conventional C/A code generator 20. The C/A code generator 20 generates G1 code and G2 code through two series of shift registers D1 to D10, to further generate C/A code, as this operation is well known to those possessing average skill in the art, details will not be reiterated here for the sake of brevity.

When the conventional baseband processing module 10 is executing signal acquisition, a complicated calculation is required, and this can affect the cold reboot efficiency which the cold reboot time cannot be shorten. If transmission of the satellite signal is being blocked, then a new search is required, and the waiting time is being reset, thus the cold reboot time will increase which can cause inconvenience to the user.

SUMMARY OF THE INVENTION

The claimed invention discloses a method for increasing acquisition efficiency in a code division multiple access (CDMA) communication system. The method comprises the following steps: receiving a first signal; generating a second signal by executing a Fourier transform operation on the first signal; determining a plurality of shift signals generated each time the second signal is being shifted by a first frequency; selecting a pseudo-random code from a plurality of pseudo-random codes, and obtaining a Fourier transform result of the pseudo-random code; multiplying the Fourier transform result of the pseudo-random code with the plurality of shift signals, and executing an inverse Fourier transform operation on the multiplication result to generate an inverse Fourier transform result; and determining an acquisition status according to the inverse Fourier transform result.

The claimed invention further discloses a receiver capable of increasing acquisition efficiency in a code division multiple access (CDMA) communication system. The receiver comprises: a signal receiving end for receiving signals; a first Fourier transform module for executing a Fourier transform operation on the signals received by the signal receiving end; a shift module for generating a plurality of shift signals each time a Fourier transform result outputted by the first Fourier transform module is being shifted by a first frequency; a pseudo-random code generator for generating a pseudo-random code according to a plurality of pseudo-random codes; a second Fourier transform module for executing the Fourier transform operation on the pseudo-random code generated by the pseudo-random code generator; a multiplier for calculating a multiplying result of the plurality of shift signals outputted by the shift module with a signal outputted by the second Fourier transform module; an inverse Fourier transform module for executing an inverse Fourier transform operation on the multiplying result outputted by the multiplier; and a determine module for determining an acquisition status according to a signal outputted by the inverse Fourier transform module.

These and other objectives of the present invention will no doubt become obvious to those of ordinary skill in the art after reading the following detailed description of the preferred embodiment that is illustrated in the various figures and drawings.

DETAILED DESCRIPTION

The present invention utilizes a frequency shift characteristic of the Fourier transform to simplify the complexity of calculations required by the aforementioned acquisition process. As for the frequency shift characteristic: On the time domain, a signal is multiplied by a constant of an index and the result corresponds to the frequency domain for executing a shift for spectrum of the signal, in another words:

$$\exp(j \times 2\pi \times f_c \times t) \times g(t) \leftarrow \rightarrow G(f-f_c) \quad \text{(Formula 1)}$$

where g (t) is a time domain signal, G (f) is frequency domain signal of g (t), →← represents Fourier transform.

Figure 3:
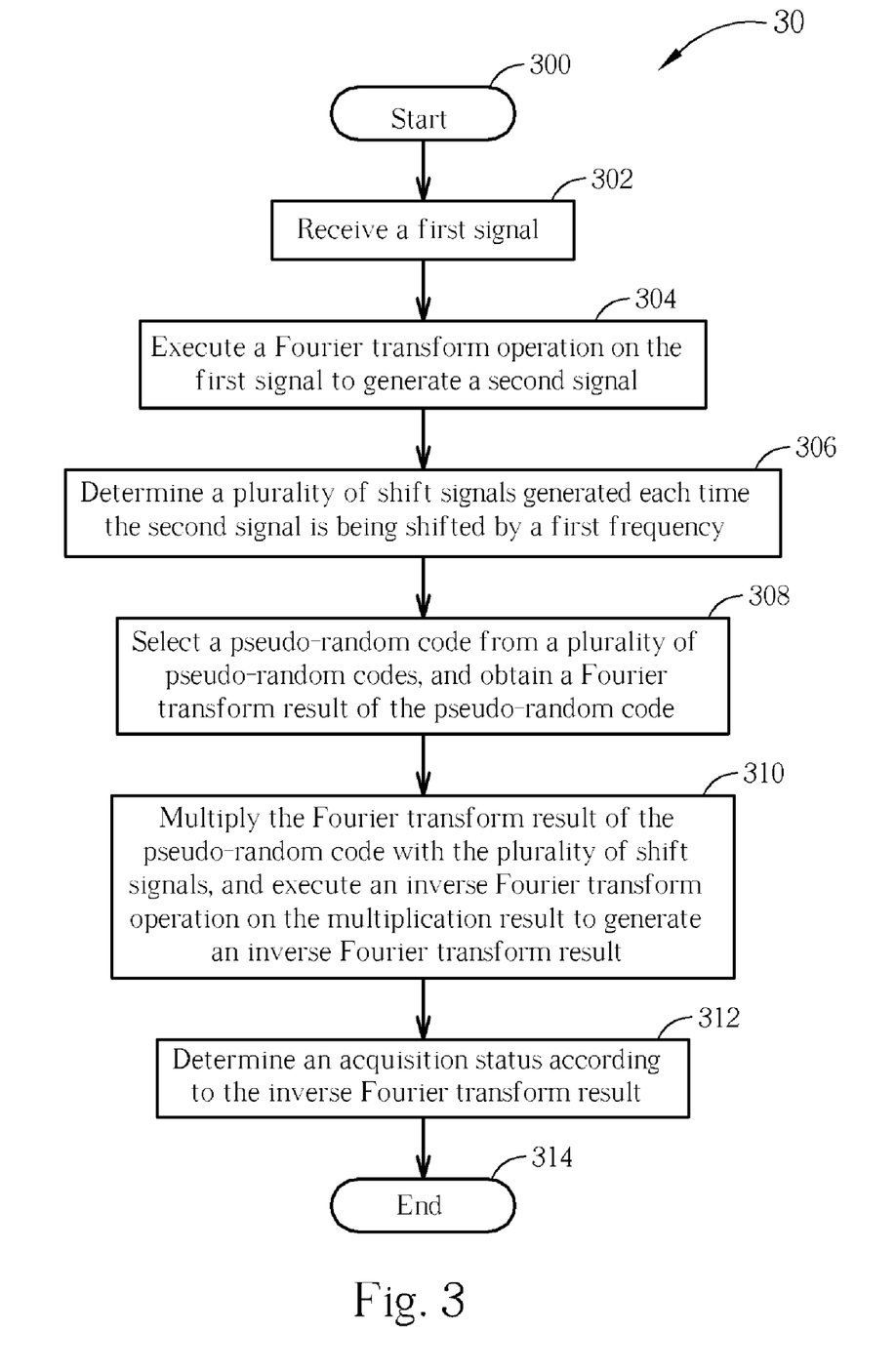
FIG. 3 illustrates a flowchart of increasing acquisition efficiency in a CDMA communication system according to an embodiment of the present invention.

Please refer to FIG. 3. FIG. 3 illustrates a flowchart 30 of increasing acquisition efficiency in a CDMA communication system according to an embodiment of the present invention. The CDMA communication system can preferably be a GPS, but this does not indicate a limitation of the present invention. The flowchart 30 includes the following steps:

Step 300: start;

Step 302: receive a first signal;

Step 304: execute a Fourier transform operation on the first signal to generate a second signal;

Step 306: determine a plurality of shift signals generated each time the second signal is shifted by a first frequency;

Step 308: select a pseudo-random code from a plurality of pseudo-random codes, and obtain a Fourier transform result of the pseudo-random code;

Step 310: multiply the Fourier transform result of the pseudo-random code with the plurality of shift signals, and execute an inverse Fourier transform operation on the multiplication result to generate an inverse Fourier transform result;

Step 312: determine an acquisition status according to the inverse Fourier transform result;

Step 314: end.

According to the flowchart 30, after the present invention executes the Fourier transform operation on the first signal to generate the second signal, the plurality of shift signals is determined each time the second signal is shifted by the first frequency, and then a multiplication operation is executed on the Fourier transform result of the pseudo-random code and the plurality of shift signals. Lastly, the acquisition status is determined according to the inverse Fourier transform result. If the acquisition fails, another pseudo-random code will be selected to execute acquisition.

In another words, in executing the acquisition flowchart, as an accurate Doppler frequency cannot be detected, the present invention converts the time domain signal (i.e., which is the first signal) into the spectrum signal (i.e., which is the second signal) through the Fourier transform operation, the signal generated each time the spectrum signal shifts a first frequency, is multiplied with the Fourier transform result of a pseudo-random code to determine degree of correlation between the first signal and the pseudo-random code. As mentioned previously, the spectrum signal is shifted by the first frequency, which corresponds to the time domain, in other words, the time domain signal is multiplied by a constant of an index.

In order to consider the effect from the Doppler effect, those skilled in the art will understand that when the digital medium frequency signal is lowered to a lower frequency, the digital medium frequency is multiplied by the signal $e^{j2\pi(f_{IF}+f_D)t}$, $f_D$ will be in between −5 KHz and +5 KHz, and a search is performed every 500 Hz. Hence, 21 multiplications must be performed. According to the frequency shift characteristic of the Fourier transform, a signal on the time domain is multiplied by constant of an index and the result corresponds to the frequency domain for executing a shift for spectrum of the signal. The present invention is realized by utilizing the characteristics of the frequency shift in the above-mentioned to compensate for the Doppler effect. In other words, the multiplication of the time domain signal with the signal $e^{j2\pi(f+f_D)t}$ can be realized each time the spectrum signal is shifted the first frequency (which is 500 Hz). When the result of the spectrum signal shifting in the first frequency is obtained, the multiplication operation is performed on the result of the spectrum signal shifting in the first frequency and the result of the Fourier transform, thus the degree of correlation between the signal and the pseudo-random code can be determined.

It is easily understood by those having average skill in this art, that the microprocessor can process shift operations in a very short time, therefore, the present invention can reduce consumption of the system resources. Furthermore, when the result of the Fourier transform of the pseudo-random code is obtained, other than performing the similar operation of the conventional method by utilizing a pseudo-random code generator, the present invention can establish a table for recording results of C/A codes passing through the Fourier transform, in this way, the Fourier transform operation of the C/A code can be reduced.

Figure 4:
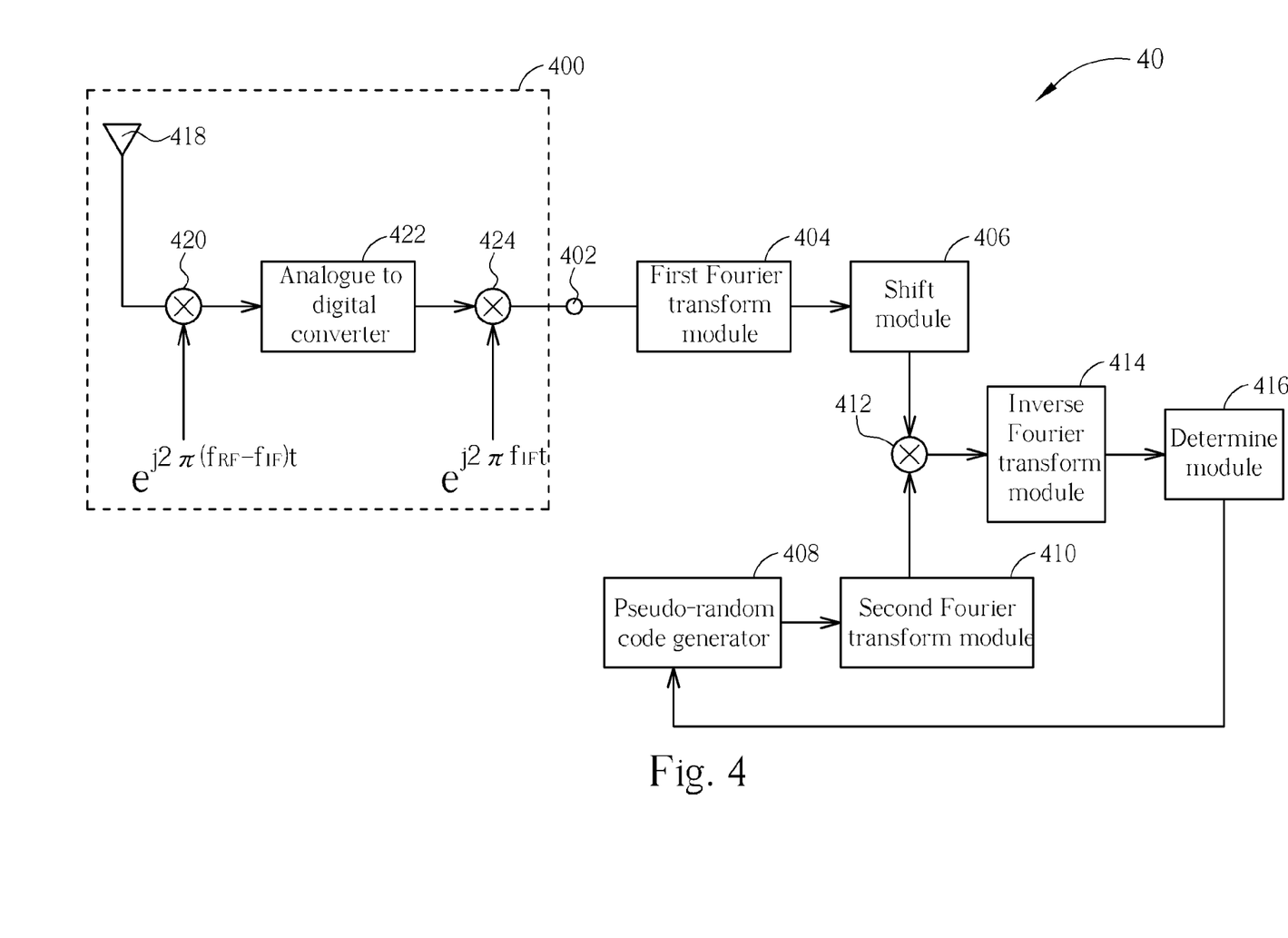
FIG. 4 illustrates a diagram of a receiver increasing acquisition efficiency in a CDMA communication system according to an embodiment of the present invention.

In realization of the flowchart 30, please refer to FIG. 4. FIG. 4 illustrates a diagram of a receiver 40 increasing acquisition efficiency in a CDMA communication system according to an embodiment of the present invention. The CDMA communication system can preferably be a GPS, the receiver 40 includes a radio frequency (RF) signal processing circuit 400, a signal receiving end 402, a first Fourier transform module 404, a shift module 406, a pseudo-random code generator 408, a second Fourier transform module 410, a multiplier 412, an inverse Fourier transform module 414, and a determine module 416. The RF signal processing circuit 400 is utilized for lowering a RF fRF to a baseband, the RF signal processing circuit 400 includes an antenna 418, a first down converter 420, an analogue to digital converter 422 and a second down converter 424. As the operation of the RF signal processing circuit 400 is well known to those skilled in the art, it will not be further reiterated for the sake of brevity. The first Fourier transform module 404, the second Fourier transform module 410 and the inverse Fourier transform module 414 are preferably converting modules designed for fast Fourier transform algorithms and inverse fast Fourier transform algorithms.

The signal-receiving end 402 is utilized for receiving signals outputted by the RF signal processing circuit 400. The first Fourier transform module 404 can perform a Fourier transform operation on the signal received by the signal receiving end 402, and then transmit the Fourier transform result to the shift module 406. The shift module 406 can shift a frequency on each time the Fourier transform result outputted by the first Fourier transform module 404 to generate a plurality of shift signals. The pseudo-random code generator 408 can generate a pseudo-random code to be converted to a frequency domain through the second Fourier transform module 410. The multiplier 412 can perform a multiplication operation on the plurality of shift signals outputted by the shift module 406 and the Fourier transform result outputted by the second Fourier transform module 410. The inverse Fourier transform module 414 can perform an inverse Fourier transform on the multiplication result of the multiplier 412 and then output the inverse Fourier transform result to the determine module for determining the degree of correlation between the signal received by the signal receiving end 402 and the pseudo-random code generated by the pseudo-random code generator 408, to further determine the Acquisition status. When the determine module 416 discovers an acquisition failure, the determine module 416 can control the pseudo-random code generator 408 to generate another pseudo-random to perform acquisition again.

In other words, when the receiver 40 performs a down frequency operation on the signal outputted by the analogue to digital converter 422, the second down converter 424 is not required to search gaps of each frequency $f_D$ each time so as to compensate for the Doppler effect. The second down converter 424 can achieve the objective of compensating for the Doppler effect through the frequency shift operation of the shift module 406. Therefore, the present invention is not required to perform 21 Fourier transform calculations, the present invention can perform 21 frequency $f_D$ shifts on the spectrum signal outputted by the first Fourier transform module 404, hence the result of 21 fast Fourier transform can be obtained. As the fast Fourier transform is a circular convolution, which is a periodic function, therefore the shift module 406 can start from 0 Hz, a shift is performed every 500 Hz, and after a total of 20 shifts, a result of 21 fast Fourier transforms can be obtained. The shift calculation can be performed in a very short time, therefore the system resources required are very insignificant, thus the entire operational speed of the present invention can be improved.

Otherwise, the present invention can establish a table for recording the results of C/A codes after the Fourier transform is performed, thus the Fourier transform calculation of the C/A codes can be reduced.

Figure 5:
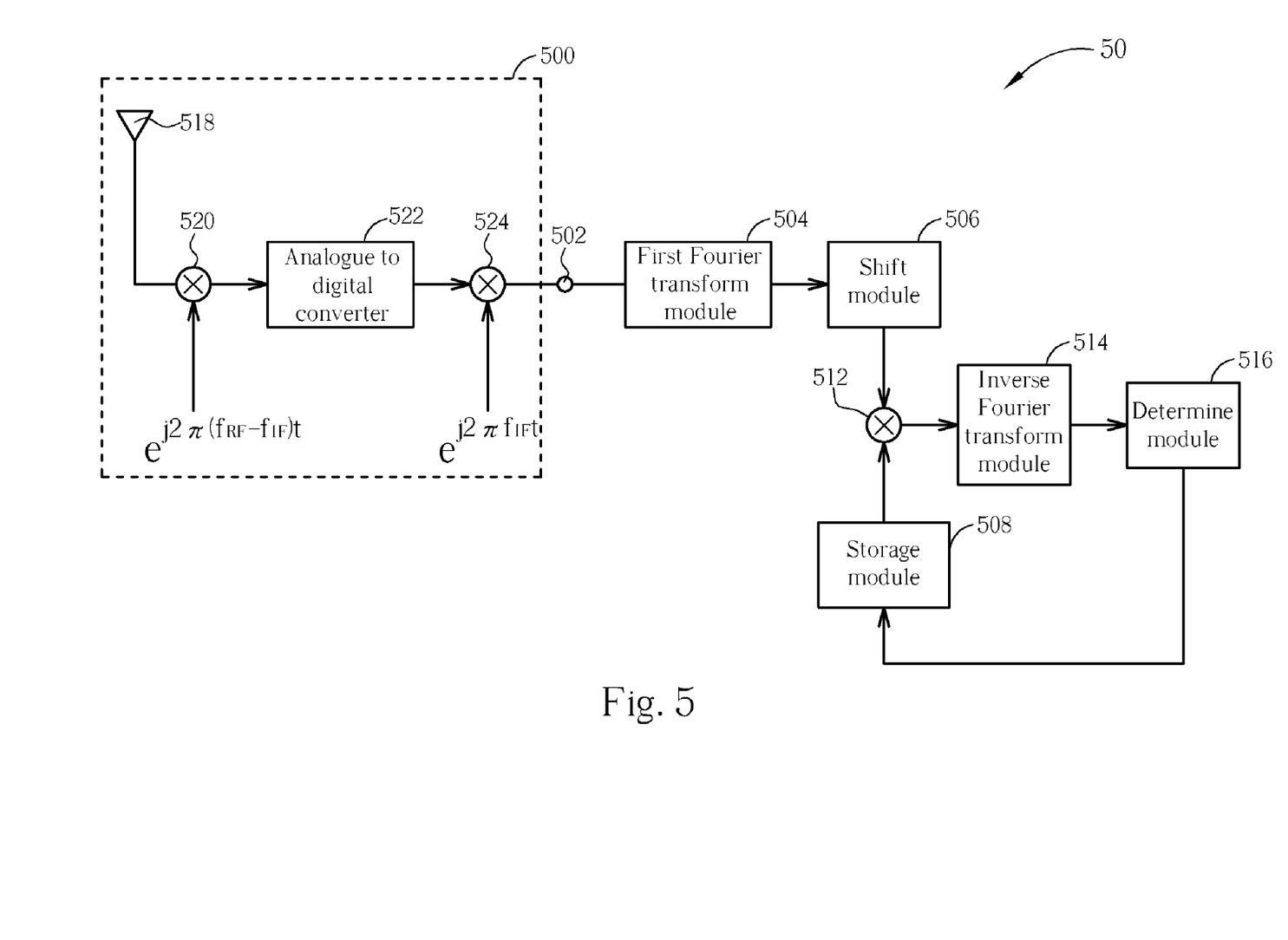
FIG. 5 illustrates a diagram of a receiver increasing an acquisition efficiency in a CDMA communication system according to an embodiment of the present invention.

Please refer to FIG. 5. FIG. 5 illustrates a diagram of a receiver 50 increasing an acquisition efficiency in a CDMA communication system according to an embodiment of the present invention. The CDMA communication system can preferably be a GPS, the receiver 50 includes a radio frequency (RF) signal processing circuit 500, a signal receiving end 502, a first Fourier transform module 504, a shift module 506, a storage module 508, a multiplier 512, an inverse Fourier transform module 514, and a determine module 516. The RF signal processing circuit 500 includes an antenna 518, a first down converter 520, an analogue to digital converter 522, and a second down converter 524. In FIG. 5, the operation methods of the components in the receiver 50 are similar to those corresponding components in receiver 40 of FIG. 4, therefore, details will not be further reiterated for the sake of brevity. Finally, the storage module 508 is utilized for storing the results of the C/A codes after the Fourier transform is performed. Any storage space required by the storage module 508 is further explained in the following:

As there are 24 satellites in space providing global positioning services, if the most accurate double data status is stored, for a USB 2.0 transmission speed, a numeric data requires 64 bits. If the sampling frequency is 12 MHz, a cycle (i.e., 1 ms) has 12000 sampling points, then actual and virtual values will be generated through the fast Fourier transform, therefore, the storage space required by the storage module 508 is:

24×12000×2×64 bits=4.608 MB.

Furthermore, in the current GPS communication system, the maximum sampling bits for the analogue to digital converter 522 is 4 bits, therefore, data of the double data status is not useful for improving the accuracy of the entire operation, thus a 4 bit data status can be utilized for storage, hence the storage space required by the storage module 508 can be shows as:

24×12000×2×4 bits=288 KB.

In this way, the storage space will not create an overburden on the remaining system.

When the storage module 508 stores the result of the C/A codes after the fast Fourier transform operation in the 4-bit data status, if the digital medium frequency signal outputted by the analogue to digital converter 522 includes N points or quadrants, then the calculations required by the receiver 50 are listed in the following:

1. Plurality of multiplication calculation of 1 N point: calculation required the multiplication of the signal $e^{j2\pi(f_{IF}+f_D)t}$ and the digital medium frequency signal.

2. Fast Fourier transform calculation of 1 N point: calculation required for the first Fourier transform module 504 to convert the signal received by the signal receiving end 502.

3. 20 shift calculation: calculation required for the shift module 506 to perform 20 shift operations on the first Fourier transform module 504 starting from 0 Hz, and a shift is performed every 500 Hz.

4. 1 checklist: select a fast Fourier transform result of a C/A code from the storage module 508.

5. Plurality of multiplication calculation of 1 N point: the multiplier 512 calculates calculation required for the product of the first Fourier transform module 504 and the signal outputted by the storage module 508.

6. Fast inverse Fourier transform calculation of 1 N point: calculation required by the inverse Fourier transform module 514.

Hence the total calculation Ct' of the receiver 50 in each cycle is:

$Ct'$=1×(plurality of multiplication calculation of $N$ point)+1×(Fast Fourier transform calculation of $N$ point)+1×(plurality of multiplication calculation of $N$ point)+1×(inverse Fourier transform calculation of $N$ point)+20×(shift calculation)+ checklist =((2×$N$+$N$×log$_2N$) plurality of multiplication calculation)+((2×$N$×log$_2N$) addition calculation)+20× (shift calculation)+checklist Because the ratio of time and the plurality of the addition calculations required by the index shifting and checklist operations of the memory (storage module 508) and the time required by the plurality of multiplication calculations is almost zero, it is known that the primary portion of the total calculation effort Ct' required by the receiver 50 each cycle is shown as: (2×N+N×log$_2$N) plurality of multiplication calculation and (2×N×log$_2$N) plurality of addition calculation. In other words, the present invention can effective reduce the calculation of the receiver 50 which is about one tenth of the calculation of the conventional method, such that the original time requires 30 seconds, but now it is being reduced to 4 seconds of a complete satellites search, hence the present invention overcomes the defect of the prior art.

Please note that in the embodiment as shown in FIG. 4 and FIG. 5, the present invention can be realized through different methods as known to those having average skill in pertinent the art, such as a System on Chip (SoC), or a program installed in a firmware.

There are more and more functions in the modern GPS receiver, for example personal digital assistant (PDA) and mobile phones nowadays will also include the GPS function. In this a complicated system, the microprocessor or digital signal processor cannot push all the calculations to positioning calculations, thus the receiver requires a more simplified algorithm, to ensure a multi-purpose system and not only for a positioning function alone, for example the PDA is unable to operate other functions at the same time, or the mobile phone is unable to make a call. Through the present invention, the receiver utilizes a simple shift calculation, which can greatly reduce the number of the fast Fourier transform usage. Furthermore, the checklist method of obtaining the result of the fast Fourier transform of the C/A codes utilizes little memory space to increase operation speed. Therefore the present invention can effectively reduce search time, and also reduce the cold reboot time of the system, if a lose track situation occurs, the present invention can search for a next signal quickly, and the situation where positioning fails on the navigation data will seldom occurs.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for increasing acquisition efficiency in a code division multiple access (CDMA) communication system, the method comprising the following steps:
   receiving a first signal;
   generating a second signal by executing a Fourier transform operation on the first signal;
   determining a plurality of shift signals generated each time the second signal being shifted by a frequency;
   selecting a pseudo-random code from a plurality of pseudo-random codes, and obtaining a Fourier transform result of the pseudo-random code;
   multiplying the Fourier transform result of the pseudo-random code with the plurality of shift signals, and executing an inverse Fourier transform operation on the multiplication result to generate an inverse Fourier transform result;
   determining an acquisition status according to the inverse Fourier transform result;
   selecting another pseudo-random code from a the plurality of pseudo-random codes and obtaining a an other Fourier transform result of the an other pseudo-random code when the Fourier transform result displays an acquisition failure;
   multiplying the other Fourier transform result of the other pseudo-random code with the plurality of shift signals, and executing an other inverse Fourier transform operation on the an other multiplication result to generate an the other inverse Fourier transform result; and
   determining an the acquisition status according to the other inverse Fourier transform result.

2. The method of claim 1 wherein the pseudo-random code is being generated and the Fourier transform result of the pseudo-random code is being calculated according to a coding rule when the pseudo-random code is selected from the plurality of pseudo-random codes and the Fourier transform result of the pseudo-random code is obtained.

3. The method of claim 1 wherein the step of selecting the pseudo-random code from the plurality of pseudo-random codes and obtaining the Fourier transform result of the pseudo-random code is executed by a storage device that records the Fourier transform result of the plurality of pseudo-random codes and obtains the Fourier transform result of the pseudo-random code.

4. The method of claim 1 wherein the CDMA communication system is a global positioning system.

5. A receiver for increasing acquisition efficiency in a code division multiple access (CDMA) communication system, the receiver comprising:
   a signal receiving end for receiving signals;
   a first Fourier transform module for executing a Fourier transform operation on the signals received by the signal receiving end;
   a shift module for generating a plurality of shift signals each time a Fourier transform result outputted by the first Fourier transform module being shifted by a frequency;
   a pseudo-random code generator for generating a pseudo-random code according to a plurality of pseudo-random codes;
   a second Fourier transform module for executing a Fourier transform operation on the pseudo-random code generated by the pseudo-random code generator;
   a multiplier for calculating a multiplying result of the plurality of shift signals outputted by the shift module with a signal outputted by the second Fourier transform module;
   an inverse Fourier transform module for executing an inverse Fourier transform operation on the multiplying result outputted by the multiplier; and
   a determine module for determining an acquisition status according to a signal outputted by the inverse Fourier transform module, and outputting the signal outputted by the inverse Fourier transform module and for controlling the pseudo-random code generator to generate another pseudo-random code when the inverse Fourier transform module outputs an inverse Fourier transform result that displays an acquisition failure.

6. The receiver of claim 5 further comprising:
   an antenna for receiving wireless signals;
   a first down converter for lowering frequency of the wireless signals received by the antenna to a medium frequency;
   an analogue to digital converter for converting a signal outputted by the first down converter to a digital signal; and
   a second down converter for outputting the digital signal to the signal receiving end after frequency of the digital signal outputted by the analogue to digital converter is lowered from the medium frequency to a baseband.

7. The receiver of claim 5 wherein the CDMA communication system is a global positioning system.

8. A receiver for increasing acquisition efficiency in a code division multiple access (CDMA) communication system, the receiver comprising:
   a signal receiving end for receiving a first signal;
   a Fourier transform module for executing a Fourier transform operation on the first signal received by the signal receiving end to generate a second signal;
   a shift module for generating a plurality of shift signals each time a Fourier transform result outputted by the Fourier transform module being shifted by a frequency;
   a storage module for storing Fourier transform results of a plurality of pseudo-random codes and for outputting a Fourier transform result of a pseudo-random code selected from the Fourier transform results of the plurality of pseudo-random codes;
   a multiplier for calculating a multiplying result of the plurality of shift signals outputted by the shift module with the Fourier transform result of the pseudo-random code outputted by the storage module;

an inverse Fourier transform module for executing an inverse Fourier transform operation on the multiplying result outputted by the multiplier; and a determine module for determining an acquisition status according to a signal outputted by the inverse Fourier transform module, and outputting the signal outputted by the inverse Fourier transform module and for controlling the storage module to select from the Fourier transform results of the plurality of pseudo-random codes to output another Fourier transform result of a pseudo-random code when the inverse Fourier transform module outputs an inverse Fourier transform result that displays an acquisition failure.

9. The receiver of claim 8 further comprising:

an antenna for receiving wireless signals;

a first down converter for lowering frequency of the wireless signals received by the antenna to a medium frequency;

an analogue to digital converter for converting a signal outputted by the first down converter to a digital signal; and a second down converter for outputting the digital signal to the signal receiving end after frequency of the digital signal outputted by the analogue to digital converter is lowered from the medium frequency to a baseband.

10. The receiver of claim 8 wherein the CDMA communication system is a global positioning system.

\* \* \* \* \*